United States Patent Office 3,387,991
Patented June 11, 1968

3,387,991
GLOW DISCHARGE POLYMERIZATION COATING OF POLYOLEFIN SURFACES TO RENDER THEM RECEPTIVE TO ADHESIVES, INKS, AND THE LIKE
Michael Erchak, Jr., Ridgewood, N.J., assignor to Rexall Drug and Chemical Company, Los Angeles, Calif., a corporation of Delaware
No Drawing. Filed Oct. 13, 1964, Ser. No. 403,647
1 Claim. (Cl. 117—93.1)

ABSTRACT OF THE DISCLOSURE

A process for treating polyolefin surfaces to render the surface receptive to adhesives, inks and other decorative matter by glow discharge polymerization of gaseous material to form a polar-constituent-containing film on the surface and then applying to the film the desired adhesive, ink or other decorative matter.

---

It is well known to treat polyolefin surfaces, particularly polyethylene, by a flame treatment or electrical discharge treatment to insure adequate adhesion of inks or adhesives subsequently placed on the surfaces. Polyolefins are extensively used in packaging, both in the form of film and blown or injection molded articles and containers, and it is desirable to print the surface of the package with trade names, trademarks, instructions and the like. As illustratively shown in U.S. Patents 2,648,097 and 2,632,921, the polyolefin surface may be treated with flame or electrical discharge to provide a surface which insures adequate adhesion of printed inks or adhesives used in pacakaging.

The present invention is directed to a process for treating polyolefin surfaces such as polyalfaolefins containing from 1 to 10 carbon atoms, and particularly polyethylene, polypropylene, and copolymers thereof, to provide a surface which readily accepts and retains printing inks and adhesives. This invention is also directed to the polyolefin article produced by the process of the present invention.

The present invention is directed to the application of a special coating to the polyolefin materials, which provides a surface on the material which is readily printable or glueable.

The application of the coating to the polyolefin surface according to the present invention has a dual function: (1) to insure proper adhesion of printing inks and adhesives as noted above; and (2) the simultaneous provision of an impermeable coating on the polyolefin material if the proper coating material is chosen.

An additional feature of the present invention is the application of the described coating to polyolefin articles having non-planar or irregular surfaces such as blow molded containers to provide a surface thereon which will insure proper adhesion of printing inks and also provide a surface on the container having the desired gloss and physical appearance to improve the aesthetics of the container.

Many polyolefin materials are permeable to oils commonly used in commodities such as lotions, tonics and the like. Thus, these materials cannot be used to package these commodities. However, by coating the polyolefin materials, particularly when in the form of a blow-molded container, the oil permeability can be minimized, thereby providing a versatile packaging material for these commodities. The present invention permits an effective coating of polyolefin containers with an oil impermeable material.

Briefly the present invention is directed to a process for treating a polyolefin surface to render it receptive to adhesives, inks, and other decorative matter, by glow discharge polymerization in which gaseous material to be polymerized is introduced to a reaction region and particles thereof, under the influence of a glow discharge, are deposited upon and form a film on the polyolefin surface. The polyolefin surface is subjected to a glow discharge zone which contains the polymerizable gaseous material. A glow discharge sustaining potential is then applied in the glow discharge zone to deposit or form a polar-constituent-containing film on the surface of the polyolefin.

A critical feature of this invention is that the film formed on the polyolefin surface must contain a plurality of polar-constitutent-containing groups. These polar constituents in the surface film can be obtained by providing a polymerizable gaseous material in the glow discharge zone which contains polar constituents. Gaseous monomers of this character are well known and will be further described hereinafter.

It is also within the scope of this invention to provide a polymerizable gaseous monomer in the glow discharge zone which does not contain a polar constituent but which is converted to a polar-constituent-containing film of the surface of the polyolefin substrate.

The method and apparatus by which a film is deposited by glow discharge on the surface of a polyolefin material is described in U.S. Patents Nos. 3,068,510 and 3,069,283, and a publication in the Journal of the Electrochemical Society, vol. 110, No. 1, January 1963, pages 15–22, entitled "Electrical Properties of Thin Organic Film" authored by Arthur Bradley and John P. Hannes. The disclosures of these patents and this publication are incorporated herein by reference for completeness of the present disclosure. The method and apparatus used for applying the polar-constituent-containing film to a polyolefin surface according to the present invention is identical to the apparatus and procedures described in these U.S. patents and publication.

The substrates, that is the materials to which the film according to the present invention may be applied, include all polyolefins, particularly alfaolefins having 1 to 10 carbon atoms, and including polyethylene, polypropylene, copolymers of ethylene and propylene, graft polymers of ethylene and propylene, block polymers of ethylene and propylene, and copolymers such as ethylene and butene (1). This invention is also applicable to deposition of a film on substrate such as laminates of other substances with the above described polyolefins where one desires to glue or print on the polyolefin surface. Laminates, such as a paper backing with a polyolefin surface are readily adaptable for use according to the present invention.

This invention is particularly adapted for the treatment of polyolefin surfaces where it is desired to print inks on or apply adhesives to the polyolefin surface and a flame or electrical discharge treatment of the surface is normally necessary to insure adequate adhesion of the ink or adhesive.

This invention is critically limited to the use of printing inks wherein the inks contain polar groups. Likewise the adhesive usable according to the present invention are adhesives, glues and the like (mostly dextrin) which contain polar groups.

The polymerizable substance, frequently referred to herein as a monomer, normally should possess a polar group such that upon its deposition on the polyolefin surface, the film formed thereon will also contain polar groups. However, as pointed out above, it is possible to use polymerizable substances, for deposition on the polyolefin surface, which do not contain polar groups but the polar group is generated through the glow discharge such that the film deposited on the polyolefin surface will contain a plurality of polar groups. Various other limitations on the polymerizable substance adapted for the glow discharge deposition on the polyolefin surface are stated in the aforementioned patents and publication.

Illustrative polar constituents and groups usable according to this invention are: $NO_2$, oxygen, acid groups, alcohol groups, ester groups, and ether groups. The polar groups provide the attractive sites for the polar constituents in the printing ink or adhesives applied to the film. The polar groups in the deposited film must be compatable with the polar groups in the applied inks or adhesives.

Illustrative of the polymerizable material (monomers) which may be introduced into the glow discharge area for deposition on the film are: vinyl chloride, 1,3,5-trichlorobenzene, chlorobenzene, picoline, nitrotoluene, acrylonitrile, p-toluidine, N,N-dimethyl-p-toluidine, aniline, malononitrile, tetracyanoethylene, thiophene, benzene selenol tetrafluoroethylene, N-nitrosodiphenylamine, thianthrene, N-nitrosopiperidine, dicyanoketene ethylacetal, cyamelurine, 1,2,4-trichlorobenzene, thiourea, thioacetamide, N-nitrosodiethylamine, and methyl mercaptan. Illustrative of the acids which may be used as the polymerizable material is octadecyanoic acid.

Inks printed on surfaces prepared according to the present invention may be tested in the well-known manner using a test known as the Scotch tape test which is described in Commercial Standards No. CS-227-59. Adhesives applied to the surface prepared according to the present invention may be tested by the well-known peel strength test which measures the separating load required to separate two surfaces bonded together by an adhesive.

As noted in the aforementioned U.S. patents and publications, many factors effect the proper deposition of the film on a polyolefin surface. These factors include the control of the geometry of the paths along which the polyolefin substrates move, the pressure of the gaseous substance supplied, the voltage existing between one polyolefin substrate and the other, the current density in the glow discharge, and the distance separating the substrates. Proper control of these factors eliminates the discharge in undesired regions and the obtention of a desired mode of discharge thereby maximizing the rate of production according to this invention.

Specifically the aforementioned patents describe apparatus for moving polyolefin film between electrodes and establishing a glow discharge therebetween in the presence of a polymerizable material. The invention according to this application utilizes substantially the same apparatus and control of the various factors necessary to effect deposition of the polymerizable material on the polyolefin film; however, the present invention is directed to the deposition of a film containing polar groups which will provide attractive sites for the polar groups contained in inks and adhesives commonly used in printing polyolefin surfaces.

A polymerizing gas discharge is produced between the substrates as described in the aforementioned patents, by applying a potential difference thereto in the order of 300 to 400 volts or more, depending upon the gaseous, polymerizable substance being used, the operating pressure, the spacing between the electrode surfaces in the film forming discharge zone, and the desired discharge current density. Attention is particularly directed to the graph of FIGURE 1 of U.S. Patent No. 3,068,510 which illustrates the control of the various factors for effecting a uniform deposition of the polymerizable material on the surface of the polyolefin substrate.

Irregular or non-planar surfaces, such as encountered on injection-molded and blow-molded plastic articles (containers and the like) can receive a film according to the present invention by providing electrodes, adjacent and spaced from the polyolefin surfaces, conforming in shape to the surfaces to be treated. The various factors for controlling the glow discharge have been described previously.

Example

Polyethylene bottles, fabricated by a conventional blow molding process, were placed inside a glow discharge chamber with one electrode positioned inside each bottle and a second electrode surrounding the outer surface of each bottle. Gaseous chlorobenzene was then introduced into the chamber after evacuation of the chamber. A potential difference of 350 volts was then established between the electrodes, thereby depositing a thin film of chlorobenzene on the surface of each bottle. The cooled bottle was subsequently printed, in a conventional manner with an ink containing polar groups. After drying, the printed bottle fulfilled the requirements of the "Scotch Tape Test."

While I have described the present preferred embodiment of my invention, it may be otherwise embodied within the scope of the following claim.

I claim:
1. In a process for treating and affixing adhesives, inks and decorative matter to a polyolefin surface, said treatment rendering the surface receptive to such adhesives, inks and other decorative matter, by glow discharge, polymerization in which gaseous material to be polymerized is introduced into a reaction region and subjected to the influence of a glow discharge to effect deposition upon said polyolefin surface and polymerized to form a film, the steps comprising:
   (a) subjecting said surface to a glow discharge zone;
   (b) introducing polymerizable gaseous material into said glow discharge zone; said gaseous material being a member selected from the group consisting of vinyl chloride, 1,3,5-trichlorobenzene, chlorobenzene, picoline, nitrotoluene, acrylonitrile, p-toluidine, N,N-dimethyl-p-toluidine, aniline, malononitrile, tetracyanoethylene, thiophene, benzene selenol, tetrafluoroethylene, n-nitrosodiphenylamine, thianthrene, N-nitrosopiperidine, dicyanoketene ethylacetal, cyamelurine, 1,2,4-trichlorobenzene, thiourea, thioacetamide, n-nitrosodiethylamine, and methyl mercaptan;
   (c) applying a glow discharge sustaining potential to said zone to form a polar-constituent-containing film on said surface; and
   (d) then, applying to said film such adhesives, inks and other decorative matter containing a polar-constituent-containing member.

References Cited

UNITED STATES PATENTS

| | | | |
|---|---|---|---|
| 3,068,510 | 12/1962 | Coleman | 204—165 |
| 3,262,808 | 7/1966 | Crooks et al. | 117—93.1 |
| 3,279,940 | 10/1966 | Francis et al. | |
| 3,314,813 | 4/1967 | Maxion. | |

OTHER REFERENCES

Bradket et al.: Jour. Electrochemical Soc., "Electrical Properties of Thin Organic Films," 110, No. 1, January 1963, pp. 15–22.

ALFRED L. LEAVITT, *Primary Examiner.*

J. H. NEWSOME, *Assistant Examiner.*